United States Patent [19]
Crump et al.

[11] Patent Number: 5,784,076
[45] Date of Patent: Jul. 21, 1998

[54] VIDEO PROCESSOR IMPLEMENTING VARIOUS DATA TRANSLATIONS USING CONTROL REGISTERS

[75] Inventors: Dwayne T. Crump, Apex; Steve T. Pancoast, Raleigh, both of N.C.

[73] Assignee: International Business Machines Corporation, Armonk, N.Y.

[21] Appl. No.: 911,404

[22] Filed: Aug. 14, 1997

Related U.S. Application Data

[63] Continuation of Ser. No. 472,578, Jun. 7, 1995, abandoned.

[51] Int. Cl.[6] .................................................. G06F 3/14
[52] U.S. Cl. ........................... 345/519; 345/154; 345/505
[58] Field of Search .................................. 345/505, 519, 345/154

[56] References Cited

U.S. PATENT DOCUMENTS

| | | | |
|---|---|---|---|
| 4,897,812 | 1/1990 | Lessard et al. | 364/900 |
| 4,962,427 | 10/1990 | Lunn et al. | 348/555 |
| 4,962,428 | 10/1990 | Tong et al. | 348/555 |
| 4,980,762 | 12/1990 | Heeger et al. | 382/107 |
| 5,038,386 | 8/1991 | Li | 382/302 |
| 5,179,530 | 1/1993 | Genusov et al. | 395/800 |
| 5,187,795 | 2/1993 | Balmforth et al. | 395/800 |
| 5,208,872 | 5/1993 | Fisher | 382/300 |
| 5,237,655 | 8/1993 | Statt et al. | 395/162 |
| 5,243,447 | 9/1993 | Bodenkamp et al. | 345/133 |
| 5,262,968 | 11/1993 | Coffield | 364/604 |
| 5,265,218 | 11/1993 | Testa et al. | 395/325 |
| 5,293,481 | 3/1994 | Mita et al. | 345/505 |
| 5,333,262 | 7/1994 | Ulichney | 345/508 |
| 5,392,391 | 2/1995 | Caulk, Jr. et al. | 395/163 |
| 5,438,663 | 8/1995 | Matsumoto et al. | 345/200 |
| 5,457,779 | 10/1995 | Harrell | 395/163 |
| 5,467,413 | 11/1995 | Barrett | 382/236 |
| 5,473,446 | 12/1995 | Perumal, Jr. et al. | 358/523 |
| 5,507,026 | 4/1996 | Fukushima et al. | 395/163 |

OTHER PUBLICATIONS

Jim Handy, "The Cache Memory Book", Academic Press Inc., 1993, pp. 200–204.

*Primary Examiner*—Eddie P. Chan
*Assistant Examiner*—Gary J. Portka
*Attorney, Agent, or Firm*—Daniel E. McConnell; Anthony N. Magistrale

[57] ABSTRACT

Advantage is taken of Very Large Scale Integrated (VLSI) circuit design and manufacture to provide, in a digital data handling system handling display signal streams, a video processor which is capable of high performance due to vector processing and special addressing modes. A single VLSI device has a plurality of processors which cooperate for generating video signal streams and which employ distinctive addressing modes for memory elements of the device. Each of the plurality of processors has associated instruction and data caches, and the processors are joined together by a wide data bus formed on the same substrate as the processors. Each processor has a load/store unit, a translation unit associated with the load/store unit, and an index control register for controlling any translation of data bit streams passed through the load/store unit. The presence and operation of the translation unit enables the device to efficiently process data streams of varying types, thereby broadening the applicability of the device.

13 Claims, 12 Drawing Sheets

VIDEO PROCESSOR IMPLEMENTING VARIOUS DATA TRANSLATIONS USING CONTROL REGISTERS

This application is a continuation of application Ser. No. 08/472,578, filed Jun. 7, 1995, now abandoned.

RELATED APPLICATIONS

This application is related to a series of applications filed on the same day, having common inventorship, and assigned to common ownership, the applications being more particularly identified as:

application Ser. No. 08/481,966, filed Jun. 7, 1995, entitled "Video Processor" (Attorney Docket No. RP9-95-002);

application Ser. No. 08/472,208, filed Jun. 7, 1995, entitled "Video Processor with Addressing Mode Control" (Attorney Docket No. RP9-95-003);

application Ser. No. 08/475,667, filed Jun. 7, 1995, now U.S. Pat. No. 5,557,759, entitled "Video Processor with Non-stalling Interrupt Service" (Attorney Docket No. RP9-95-004);

application Ser. No. 08/475,666, filed Jun. 7, 1995, entitled "Video Processor with Serialization FIFO" (Attorney Docket No. RP9-95-006);

application Ser. No. 08/475,664, filed Jun. 7, 1995, now U.S. Pat. No. 5,638,531, entitled "Video Processor with Video Refresh Logic" (Attorney Docket No. RP9-95-007).

BACKGROUND OF THE INVENTION

Digital data handling systems typically in use generate video signals which are used to create displays for a user of the system. Examples of such systems include personal computers and consumer systems such as television receivers with associated set top boxes, video game machines and the like.

As the demands on such systems for data processing have increased, due to the rising popularity of video conferencing, compression/decompression of video signal streams, and three dimensional rendering of images presented, the limits of digital data handling in such systems as have been known heretofore have been approached or exceeded. As a consequence, attempts to succeed at the applications mentioned have resulted in degraded performance. Thus high quality three dimensional rendering (to choose only a single example) has resulted in slowing of the responsiveness of the system generating such a display.

SUMMARY OF THE INVENTION

With the foregoing in mind, it is one purpose of the invention described hereinafter to improve the performance capability of a system of the general type described. In realizing this purpose, advantage is taken of Very Large Scale Integrated (VLSI) circuit design and manufacture to provide, in a digital data handling system handling display signal streams, a video processor which is capable of high performance due to vector processing and special addressing modes.

Yet another purpose of the invention is to provide, on a single VLSI device, a plurality of processors which cooperate for generating video signal streams and which employ distinctive addressing modes for memory elements of the device. In realizing this purpose, the device has a plurality of processors, each of which has associated instruction and data caches, which are joined together by a wide data bus formed on the same substrate as the processors. Each processor has a load/store unit, a translation unit associated with the load/store unit, and an index control register for controlling any translation of data bit streams passed through the load/store unit. The presence and operation of the translation unit enables the device to efficiently process data streams of varying types, thereby broadening the applicability of the device.

BRIEF DESCRIPTION OF THE DRAWINGS

Some of the purposes of the invention having been stated, other objects will appear as the description proceeds, when taken in connection with the accompanying drawings, in which.

DESCRIPTION OF THE PREFERRED EMBODIMENT(S)

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
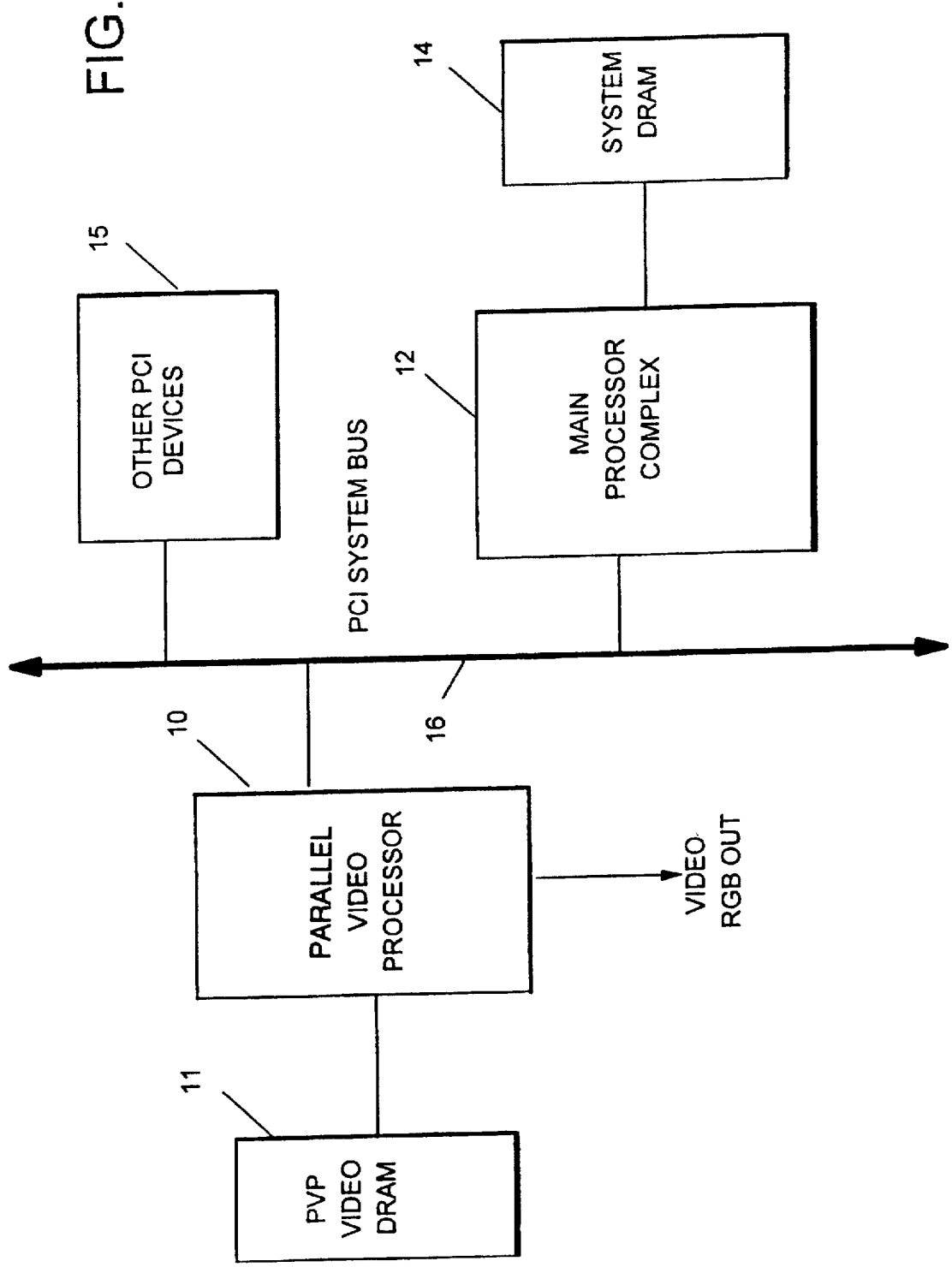
FIG. 1 is an illustration of a first system using the video processor of this invention.

Much of the following disclosure will address a particular processor architecture and its embodiment on a single chip device. At the outset, however, it is appropriate to first turn to the particular systems in which the processor device finds utility. Referring now to FIG. 1, a system is there illustrated which, in skeletal form, most closely approaches certain personal computer systems. As there shown, the system has a parallel video processor 10 (or PVP as will be described more fully hereinafter) which is coupled to video processor memory 11 and will provide a video output signal (indicated as RGB out). The system also has a main processor complex 12 which may be an X86 architecture based complex or a RISC (Reduced Instruction Set Computing) processor such as the PowerPC processor chip and support chips. System memory 14 is operatively associated with the main processor complex 12. The PVP 10 and main processor complex 12, along with other peripheral devices 15, are coupled through a PCI bus 16 (that being a bus specification which is becoming widely known and adopted in the personal computer industry).

Figure 2:
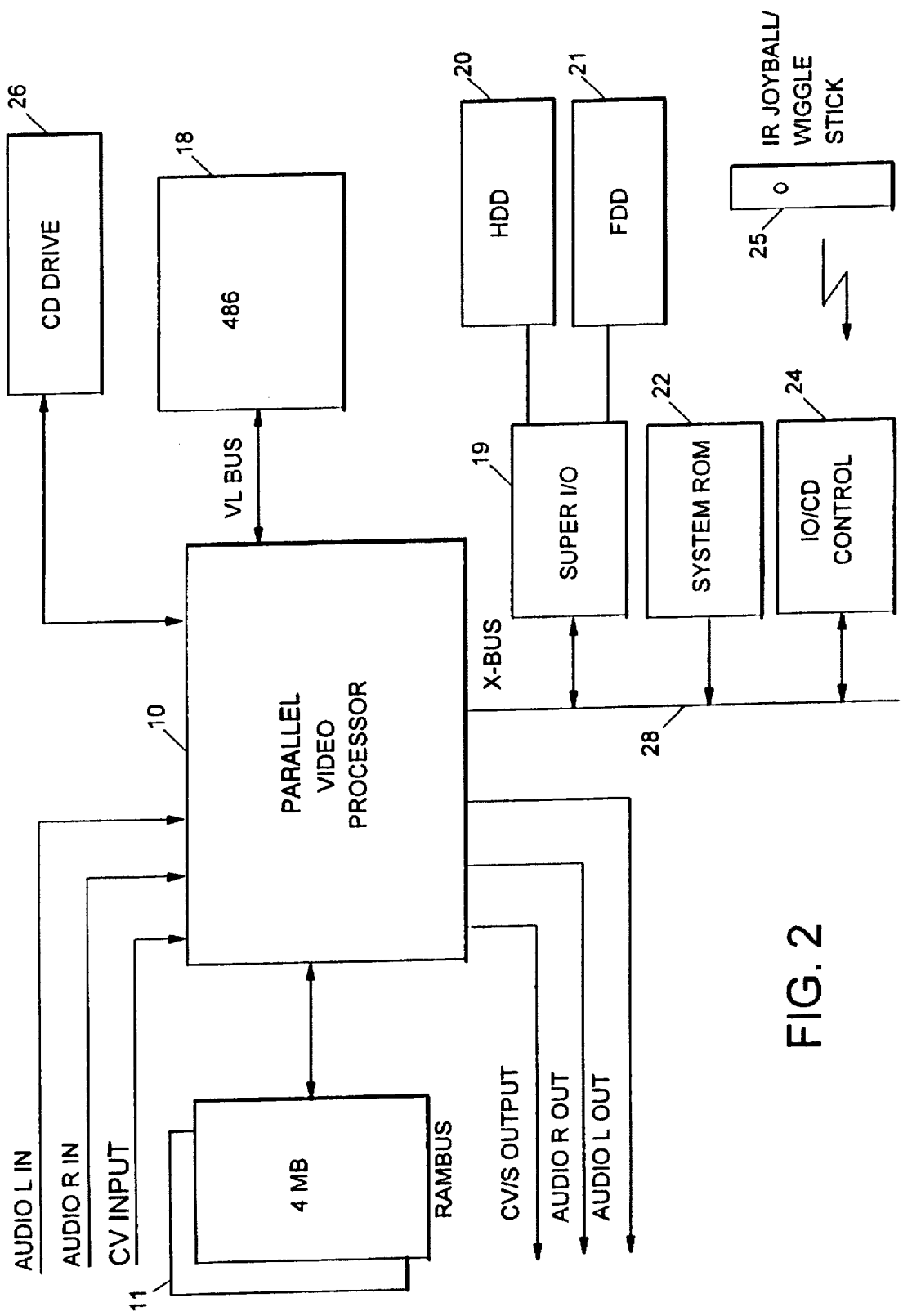
FIG. 2 is an illustration of a second system using the video processor of this invention.

Another context for use of the PVP 10 may be a system more dedicated to specific consumer use such as a set top device to be used with a television receiver as a display. Such as system is illustrated in FIG. 2, where the video processor of this invention is indicated at 10 and the associated memory is indicated at 11 as in FIG. 1. In the system of FIG. 2, the PVP 10 is associated with a 80486 type processor 18, an Input/Output handler 19 which may support a harddisk drive 20 and/or floppy disk drive 21, system read only memory 22, an Input/Output/Compact Diskette controller 24 responsive to a remote control device 25, and a Compact Diskette drive 26. A suitable bus, such as the X-bus 28, may join elements of the system.

Figure 3:
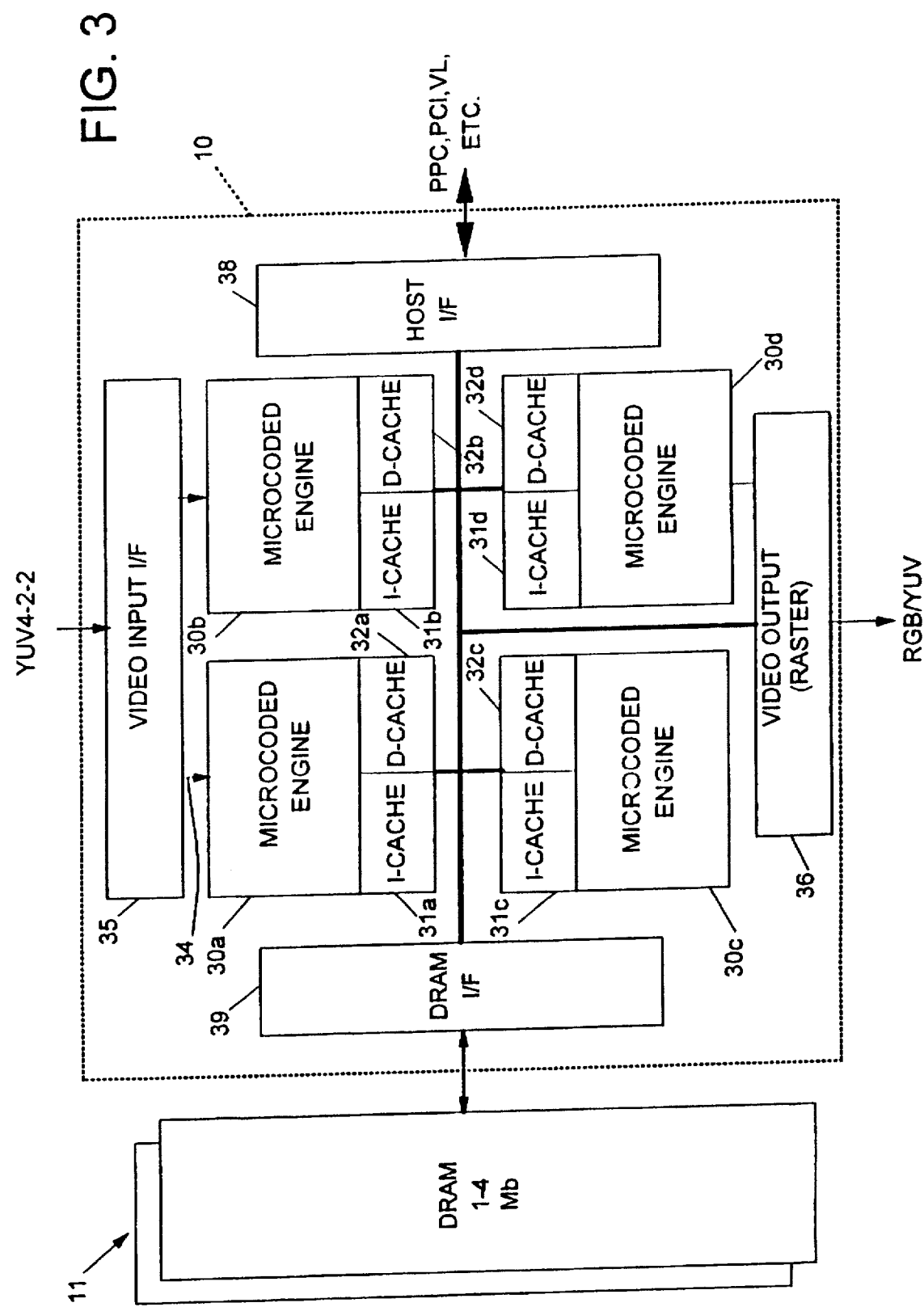
FIG. 3 is a schematic illustration of the video processor of this invention.

The Parallel Video Processor (PVP) 10 to be described hereinafter is a video processing architecture designed to handle the increasing demand for real time video and image processing. Video conferencing, MPEG decompression, and 3D rendering for scientific and entertainment applications are all examples of video processing that require significant computational power to perform in real time. Fortunately, graphical algorithms can typically be partitioned across a parallel processing system. The PVP is unique in its approach to video processing. Rather than develop dedicated logic for MPEG, 3D assist, etc. the PVP provides logic that is programmable and reusable for different algorithms, integrating a parallel video processing system onto a single Very Large Scale Integrated (VLSI) device. Each of a plurality of processors (indicated at 30a, 30b, 30c and 30d in FIG. 3) is a microcoded engine in the form of a Harvard architecture device with an instruction cache (31a, 31b, 31c and 31d) and a data cache (32a, 32b, 32c and 32d). The reference character terminology here adopted is to use a common numerical portion to indicate elements of identical structure, with postscript letters to indicate which specific one of a plurality of elements provided may be referenced. Where only the numerical designation is used in this description, the description given is applicable to any one of the plurality of like elements. Each processor can run primarily out of the associated caches and only stall on a miss. While four microcoded engines are shown and will be described, the number provided may be any number greater than one, to be determined by the performance desired for the PVP 10. For the uses here described, four is a good number of engines, and it is contemplated that the number of engines usually will be four or more.

The fact that all processors are on a common, single substrate allows for higher bandwidth communication between the processors and memory. A single bus 34, here called a line bus, has been chosen as the interconnect mechanism. The bus is very wide, i.e. it can transfer an entire cache line between caches 31, 32 or between a cache 31, 32 and memory interface 39 during each bus cycle. All processors 30 have a unified memory address space. Any processor 30 can access and cache any portion of on or off screen memory.

This single bus multiprocessor approach allows for many variations when fabricating silicon. For example, a low end chip may only have two processors, a host I/F, and a 32 bit DRAM I/F. Such a chip might be capable of MPEG-1 decompression and 2D and 3D rendering. A high end chip may have six processors, a host I/F, dual RAMBUS I/Fs, and a YUV input port. This chip could support MPEG-2 decompression, teleconferencing, and exceptional 3D rendering capabilities. Standardizing the processing engines, instruction set and internal bus allows a family of chips to be produced that can be customized for a particular product.

Although there can be a family of products that use this architecture, the intent is not to produce a custom chip for each application. The beauty of this architecture is the programmability of the processors enabling implementation of a wide variety of computationally intensive tasks. A processor that is dedicated to performing inverse discrete cosine transforms when decompressing a movie may be reprogrammed to translate and render a 3D object while playing a video game.

The PVP meets these goals by providing a scaleable multi-processor complex that can be sized to meet the design requirements. The architecture features a wide line bus with advanced cache management that allows from one to ten processor engines on the same silicon die or substrate. A design featuring four processors provides the processing power necessary to decode live MPEG 1 and 2 video signal streams and live video streams. In addition, the PVP can be reprogrammed to provide truly outstanding 2D & 3D graphics.

The PVP processors are not designed as general purpose processors or DSPs. Instead, the PVP processors have been explicitly designed to process video and graphic type algorithms. It is for this reason that the PVP is set up to process four element vectors with a limited ALU instruction set that is tuned for video/graphic applications.

The PVP 10 makes efficient use of memory 11 by allowing the graphics complex and MPEG complex to share the same memory. This allows the same two megabytes of memory to be used for MPEG decode or high end graphics. Of course, the same memory cannot be used to perform both functions at the same time.

The PVP minimizes the amount of silicon by not requiring the processors to be general purpose in nature. The ALU features a reduced instruction set and is sixteen bits in width and the multiply unit is sixteen bits as well (thirty two bit result into dedicated MAC registers). This reduces the amount of silicon required. In addition, the amount of I cache 31 and D cache 32 have been kept to a minimum.
The Control Bus The intent of the control bus is to provide a control/status interface to each subsystem on chip without penalizing the high speed line bus 34. The control bus is 16 bits wide and is used primarily for configuring devices and checking status. In a situation where the host processor 12, 18 must poll one of the PVP processors 30 for status, this polling can be done across the control bus. The host processor also may individually reset or restart the processors by writing to the processor's control port.

In general, the host I/F's I/O space should be mapped to the control bus. Each subsystem has a unique set of registers accessible from the control bus. For example, each processor has a control port for resetting and a vector address register. A video output subsystem has vertical and horizontal timing registers. The protocol on the sixteen bit bus matches that of the PCAT I/O space in order to facilitate producing a VGA compatible chip (and in lieu of creating an arbitrary interface).

The control bus is also beneficial in debug mode. The control port is used to halt processor execution, examine register contents and optionally single step through code. Performing these types of operations via the control bus leaves the line bus free for other processors that may be executing time critical code.

The master of the control bus is the host interface 38. It is designed to handle IO from the host bus. Alternatively, a special IO address space could be added to the line bus. This way, the host could use the control bus without taking bandwidth from the line bus or a master on the line bus could access the control bus without arbitrating for and using bandwidth from the host bus.

Since performance is not an issue with the control bus, a very simple protocol (similar to that known as Industry Standard Architecture or AT Bus, but not fully identical) is used to minimize the necessary hardware in each control bus slave. A fixed pulse width read and write strobe are used for the data transfer.

A1–15—IO (word) address to transfer to/from.

D0–15—data bus

BLE—selects the low data byte

BHE—selects the hi data byte

RD#—read strobe

WR#—write strobe

The Line Bus

The line bus 34 is the common point to which all subsystems of the PVP 10 interface. It has a very wide data path (one hundred twenty eight bits) that is capable of transferring an entire cache line in a single transaction. This wide data path allows very fast cache to cache transfers and eliminates the need for steering logic on the caches' line bus ports. Address and data phases are pipelined on the line bus. That is, the address phase of the current transaction is occurring simultaneously with the data phase of the previous transaction. There are no wait states allowed on the address or the data phases. If data cannot be obtained in zero wait states, the slave must issue a negative acknowledge (NACK) to indicate to the master that the cycle must be retried. This frees the bus for other transactions between retries.

The line bus 34 is designed to maximize overall bandwidth, sometimes at the expense of transaction latency. For example, split transaction reads are supported that allow the slave to latch the read address and return a Queue acknowledge (QACK). The bus is free to serve other masters' transactions. When the slave has obtained the data, it must arbitrate for the line bus, become a master, and complete the transaction by transmitting the data back to the pending master. These split transaction cycles will leave a master pending longer (increased latency) than if wait states were inserted, but minimizes the bandwidth required of the line bus.

Several pipelining aspects have been incorporated to minimize the effect of the added latency. For example, software pipelining allows code to request a data item be loaded into its cache. This "touch" instruction will not stall the instruction pipe. Instead, the read is initiated on the bus (if a cache miss occurs) and the processor 30 is free to continue executing instructions. The processor 30 will only stall if an attempt is made to load the data into a register before it has been cached. Hardware read-ahead is implemented by an index control register to indicate that the next sequential line will be needed. On an access to the cache the next sequential cache line would be checked to see if it is available (when the read ahead qualifier was present). If not, the cache line would be requested before the processor could cause the miss by attempting an access. Instruction fetches from an I-cache should always be treated as "read ahead" enabled due to the highly sequential nature of code execution.

An extensive cache coherency protocol is outlined elsewhere in this specification. The D-caches 32 each support write back capability with a dirty bit per byte and a protocol for transferring dirty lines between caches. This allows processors 30 to modify different bytes (or pels) within the same cache line without requiring the line to be written back to DRAM. Dirty lines will remain cached until pushed out by subsequent cache misses. By using Stream or Broadcast addressing, the cache RAM can be used to implement virtual FIFOs or capture broadcast data. Both of these techniques can substantially reduce line bus traffic.

The signals comprising the line bus are discussed in the following logical groups:

Control

The control signals are as follows:

BUSCLK—The bus clock is the main clock from which all bus transactions are timed. All other subsystems (where appropriate) should use a divide down from this clock to drive their internal logic. The host I/F for example will have to synchronize transactions from the host bus to the bus clock. All signal transitions should be referenced to the rising edge of this clock.

RESET#—The reset signal can be asserted by software or driven from a hardware reset from the host I/F. In response to this signal, all subsystems should reset to the default state.

Arbitration

The arbitration signals are used to determine which requesting master will acquire use of the bus. When granted the bus, a master may drive the address phase signals during the next clock period. The data phase for that master will immediately follow the address phase.

REQn#—The bus request signal is asserted by a master when it requires access to the bus. There is a unique bus request signal for every subsystem that has master capability. It should be asserted sufficiently before a rising clock edge for the arbitration logic to settle and resolve a master for the coming clock period. The request signal should be released during the address phase of the master's transaction.

GNTn#—The bus grant signal is asserted synchronously by the arbitration logic to select which master will control the bus for the next transaction. There is a unique bus grant signal for every subsystem that has master capability. The grant signals change to reflect the next master during the address phase of every transaction. The arbiter should implement some sort of fairness algorithm to avoid starving a master from the bus.

LOCK#—A master may use the lock signal to gain exclusive access to the bus for multiple transactions, e.g. atomic read-modify-write cycles. The lock signal should be asserted by the master during the address phase of its transaction. It should continue holding both its REQn# and the LOCK# signal until the address phase of the last transaction. If a master has been continually receiving NACKs from a slave, the master should use the LOCK# signal to gain exclusive access to the slave and force completion of the cycle.

Address Phase

The address phase signals are all driven by the master. All D-caches must decode the address phase signals in order to determine if lines need to be supplied or invalidated. The DRAM and host interfaces also decode the address to determine if the address lies within their specified region.

ADS#—The address strobe signal is driven by the master during a valid address phase. It is used to qualify the following signals as being driven to valid states.

WR—The write signal distinguishes between read and write cycles. More specifically, it determines whether the master or slave will be driving the data bus during the data phase.

ADR4-23—These address lines specify the destination address for the transaction. Note that there are no ADR0-3 because the bus transfers an entire line (sixteen bytes) at a time. Note that there is a physical addressability limit of sixteen Mbytes.

The following signals are considered part of the address qualifier:

MID0-3—Master ID bits (up to fifteen possible master subsystems—zero is reserved) are driven by the master during stream transactions to specify the destination master. The master drives his own ID during all other transactions. If a read transaction is split, the slave must latch the ID and address the pending master using the latched ID during the Read Reply.

LAH—The look ahead address qualifier is used to indicated to the cache subsystems that sequential addressing is likely from this address. Therefore, the caches should acquire the next line if necessary.

STR—The stream signal is used to indicate that a particular master should be addressed as specified by the MID0-3 bits. Stream transactions are used for virtual FIFOs and for read replies where the data (and the address) of the transaction is intended for a particular master. During the read reply, the pending master can always accept the data therefore a NACK will never be received. For virtual FIFO support, a NACK may be received if the FIFO is full (write) or empty (read).

BC—The Broadcast signal is used to indicate that all masters should participate in this cycle. During a write broadcast, all masters attempt to latch the data from the bus. This is useful if the data is likely to be used by many processors. It saves line bus bandwidth by not requiring each processor to retrieve the data individually. A read broadcast (broadcall) is identical to a memory read except that all caches attempt to latch the data in addition to the initiating master.

ACQ/RPL—The Acquire/reply signal is used to distinguish a normal memory read from an acquire read. The acquire is a result of a write miss and serves to obtain exclusive access to a line. The acquire/reply signal also distinguished a read reply from a stream write.

IO—The IO signal is used to distinguish normal memory reads and writes from Input/Output instructions. The host interface is the only subsystem that responds to the IO address space from the line bus.

HOST—The HOST signal is used to indicate that the memory cycle is intended for the host bus. The PVP must become a master and perform the memory cycle on the host bus. Currently only memory space is supported (no IO).

Data Phase

DAT0-127—The data signals contain the data bits of the line (or partial line) that is being transferred. DAT0-7 correspond to byte 0 of the line and DAT 120-127 correspond to byte 15 of the line. Data is arranged in little endian order.

BE0-15#—The byte enable signals are driven active to indicate which bytes (DAT signals) contain valid data. In fact, for invalid bytes the corresponding DAT signals should be tristated.

DIRTY—This signal is used to indicated whether the BE0-15# bits indicate which bytes in the line are valid or which bytes in the line are dirty.

DACK#—The data acknowledge signal is asserted by any (and all) slaves that can accept the data transfer (on a write) or supply data (on a read) during the subsequent data phase.

QACK#—The queue acknowledge signal is asserted by the addressed slave to indicate that the write data has been queued for write or the read request has been queued. For reads, this indicates that the bus cycle has been split. That is, the slave will have to arbitrate for the bus to return the requested data. QACK# is lower priority than DACK#. That is, if a DACK# is returned by a D-cache and a QACK# is returned by the DRAM I/F during the same read data phase, the DRAM I/F should abort its DRAM read.

NACK#—A negative acknowledge is returned by the addressed slave when it is busy and cannot return (or latch) the requested data or even latch the request. In response to a NACK#, the master should re-arbitrate for the bus and immediately retry the bus transaction.

Arbitration is the mechanism by which only one device is selected to be the master of the line bus, i.e. drive the address phase signals. Virtually every device connected to the line bus will have master capability, even the DRAM interface (s). The DRAM interface will have to become a master to return data in a split transaction cycle. Since the address and data phases of the line bus are pipelined, a master really only owns the bus for a single clock cycle. A new master can be driving the line bus every clock cycle. Therefore, arbitration must be able to occur in a single clock cycle as well to keep the line bus constantly busy.

Figure 4:
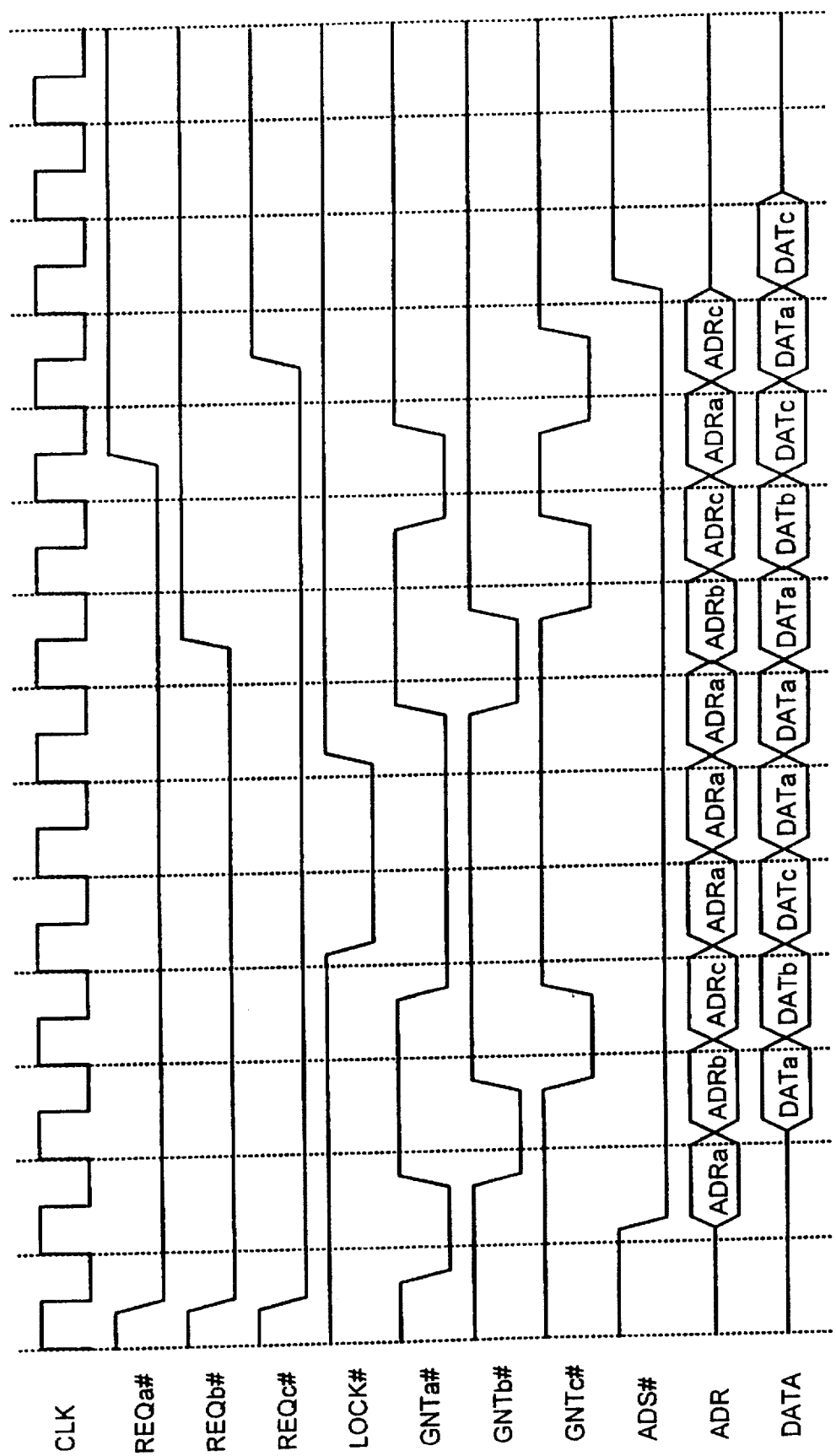
FIGS. 4, 5 and 6 are signal timing diagrams of certain operations performed by the video processor of FIG. 3.

The arbitration for ownership of the line bus 34 takes place concurrently with bus cycles. In other words, while one master is performing a transfer on the bus, all masters competing for the bus have issued requests and the arbitration logic is settling. Therefore, the next master can be selected for the next available bus cycle. FIG. 4 shows an example where many masters request the bus at the same time. The arbitration logic is able to select a new master every clock cycle so that the bus does not go idle.

The arbitration logic is asynchronous—it does not consume a clock to issue a grant. The requests must be issued soon enough after one clock edge so that the grant logic will settle before the next clock edge. After receiving a grant in clock n, the agent owns the n+1 cycle as the address phase of its transaction and the n+2 cycle as its data phase. This one clock latency was deemed necessary to allow for the propagation delay of address information across a heavily loaded bus and through cache hit logic before data could be returned. The arbiter should implement a fairness algorithm (e.g. rotating priority) to avoid starving an agent from the bus. The LOCK# signal can be asserted during the address phase of a bus cycle to extend access to the bus. This can be used to implement atomic bus cycles or to prevent starvation due to repetitive NACKs from the destination agent.

The following table summarizes the transactions that can occur on the line bus.

| WR, STR, BC, ACQ | | Transaction code bits - WRrite, STReam, BroadCast |
|---|---|---|
| Memory Read | 000 0 | Read a line into a local cache. The ID of the requesting agent is supplied so that split transaction cycles can be completed via the Read Reply cycle. A local cache may be able to supply all or a portion of the line in which case the DRAM should terminate its cycle. |
| Acquire | 000 1 | An acquire cycle is similar to a read except that the DRAM interface does not participate in the cycle. Only other caches may supply data to the requesting master. Any cache that supplies the data must invalidate that cache line. |
| Write Memory | 100 0 | Write all or a portion of a line back to DRAM. |
| Read Reply | 110 1 | This cycle is initiated by the DRAM or host I/F to respond to a read cycle that has been split. The |

-continued

| WR, STR, B C, ACQ | | Transaction code bits - WRrite, STReam, BroadCast |
|---|---|---|
| | | agent ID that was broadcast during the read is used to address the requesting agent. |
| Broadcast | 1010 | A broadcast cycle can simultaneously update lines within multiple caches. Broadcast data is conventional in that it can be accessed multiple times by the local processor and it can be flushed out to DRAM when space is needed in the cache. |
| Broadcall | 0010 | A broadcall is similar to a broadcast in that all caches attempt to latch the data as it is read from DRAM. |
| Stream Read | 0100 | A stream read removes data from a virtual "FIFO" established in a cache. Reading an address that is not valid will result in a NACK. A read operation from a valid line invalidates the data read from the line. |
| Stream Write | 1100 | A stream write adds data to a virtual "FIFO" established in a cache. Writing to an already valid entry returns a NACK. A write operation to an invalid portion of a line sets the data to the valid state. |

Figure 5:
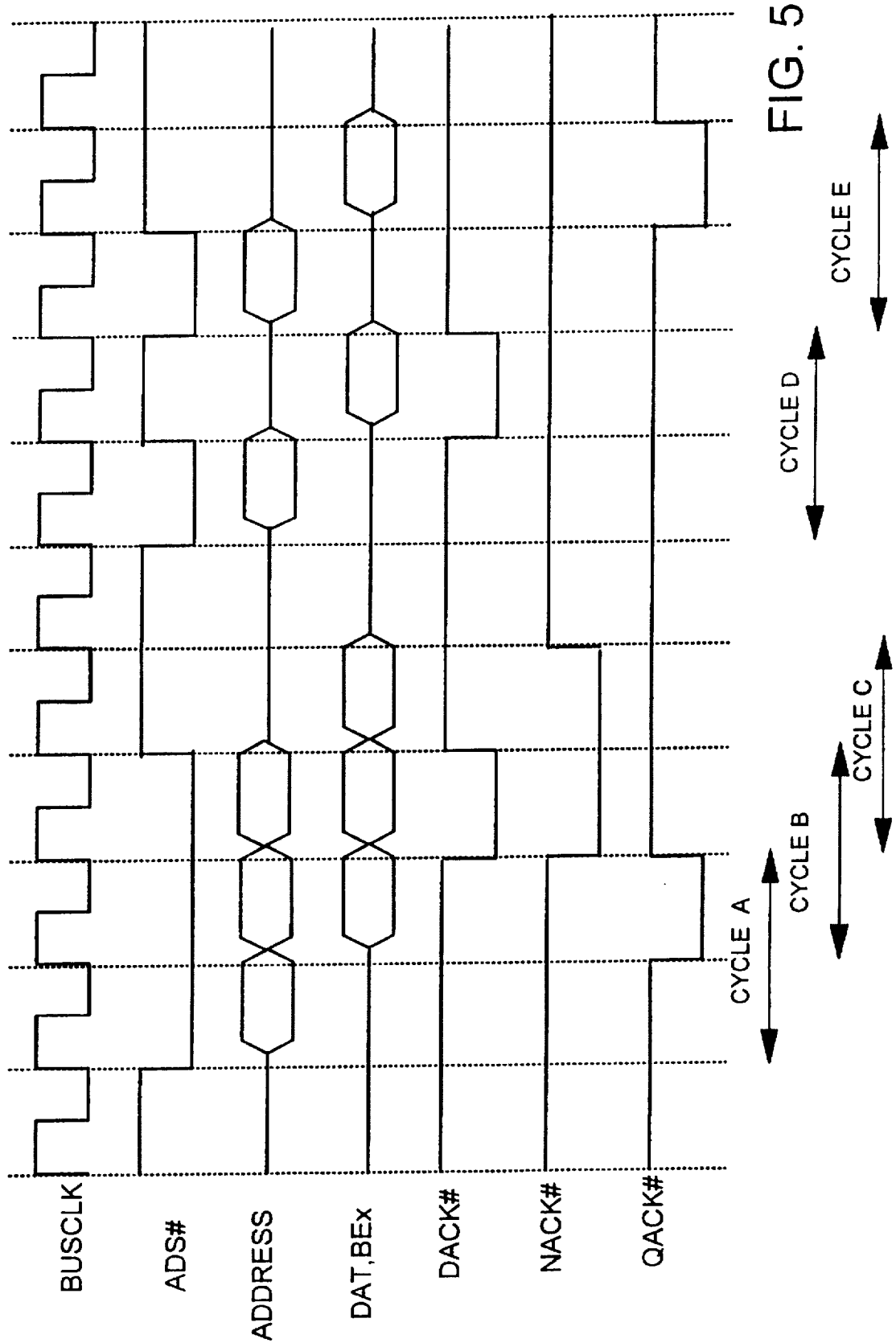

A memory read will occur whenever a subsystem needs to acquire a cache line (typically this will be the result of a cache miss). Some examples of read cycle timing are shown in FIG. 5.

In the diagram, cycle A occurs when a master (M1) requests a line. The read request is latched by the DRAM interface however the data has not yet been read from DRAM. Therefore, the transaction is terminated with a Queue ACKnowlege. The DRAM I/F is now busy reading the requested line from DRAM. In Cycle B, a second master (M2) requests a line. In this case, the DRAM I/F returns a Negative ACKnowlege indicating that the master must repeat the cycle. However, simultaneously a snooping cache detected that it had a valid copy of the requested line and supplied it along with a Data Acknowledge. Master M2 can then receive a copy of the data and does not need to retry. In Cycle C, a third master (M3) also receives a Negative ACKnowlege in response to reading a line. This master must rearbitrate for the bus and retry the cycle. In Cycle D, the DRAM interface has obtained the data that master M1 requested. It arbitrates for the bus and sends the data using a Read Reply transaction. In Cycle E, master M3 has retied the cycle and the DRAM interface has queued the request.

In Cycle B, it is possible that the snooping cache only has a portion of the line (e.g. one dirty byte). In this case, a second miss may occur and master M2 will have to request the line again. Upon receiving the line from DRAM, the line should be merged with the dirty data that is already cached.

A memory acquire will occur when a master needs to acquire exclusive access to a cache line in order to modify the contents (this will be the result of a cache write miss). The acquire cycle is very similar to the read cycle except that the DRAM interface does not participate because the initiating cache terminates the DRAM cycle by pulling DACK. Therefore, is possible (and very probable) that the acquire cycle will result in no valid data. During the acquire cycle, the initiating cache latches any valid data as dirty. Therefore all or a portion of the line will have to be written back later.

This protocol for passing dirty lines between caches can be very beneficial in graphics applications. For example, assume that two processors are rendering polygons and the boundary between the polygons, as is very likely, lies within a cache line. As pels are written by each processor, the line (with its partial dirty contents) will be passed back and forth between caches as needed. Only when one of the caches has to force the line out of its cache will the data be written to DRAM. Therefore the DRAM interface will only see one line write as a result of the many individual pel writes that the processors performed.

Figure 6:
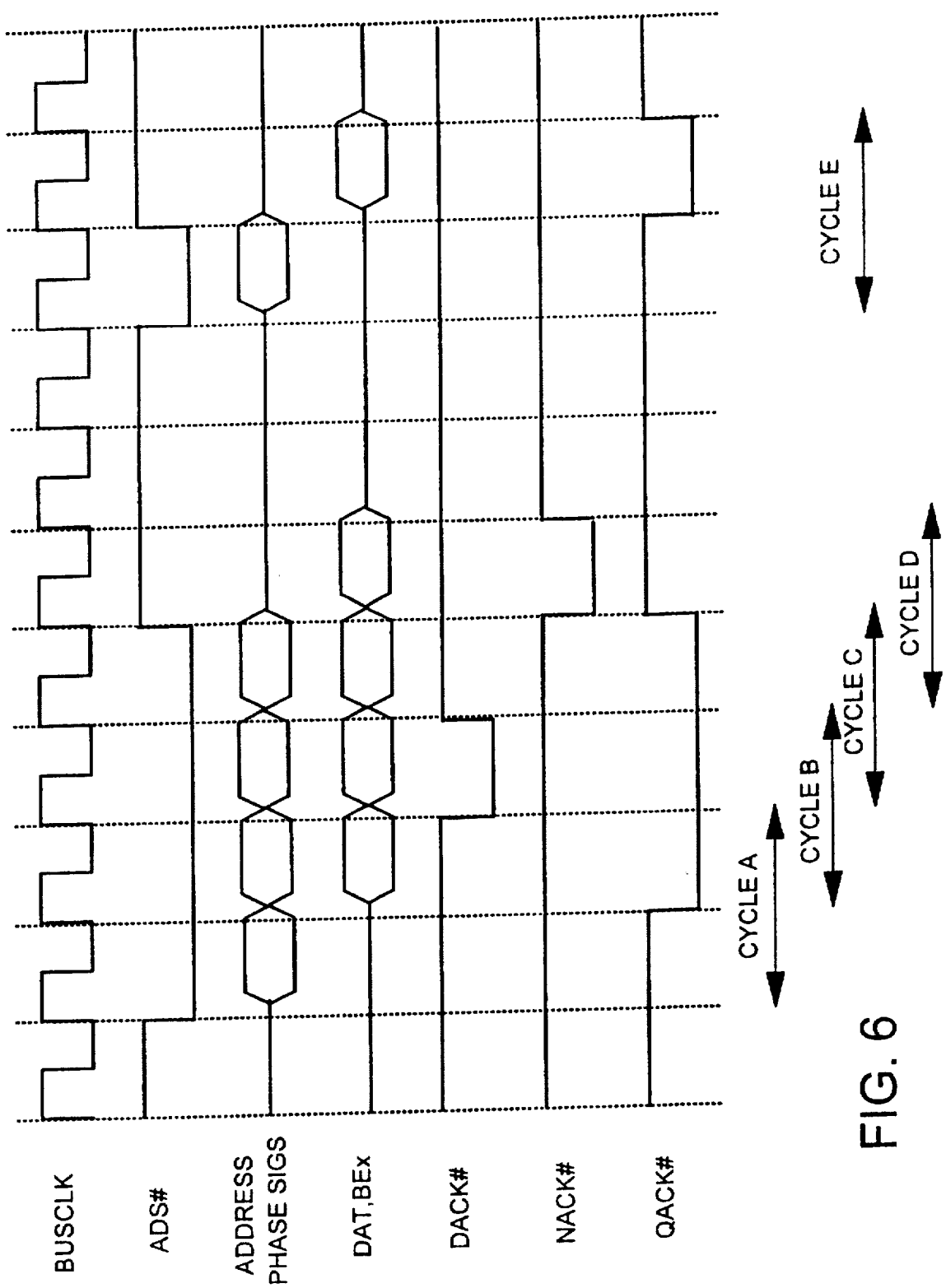

A memory write will occur whenever a subsystem needs to write a line (typically this will be the result of a cache writing back a dirty line). Some examples of write cycle timing are shown in FIG. 6.

In the diagram, cycle A occurs when a master (M1) writes a line. The write is posted to the DRAM interface. The transaction is terminated with a Queue ACKnowlege. The DRAM I/F is now busy writing the requested line to DRAM. In Cycle B, a second master (M2) writes a line. The DRAM interface can also post this write so it again returns a Queue ACKnowlege. However, simultaneously a snooping cache detected that it had a free line to accept the dirty data so it receives the data and returns a Data Acknowledge. The DRAM interface detects the DACK and can terminate the pending write cycle to DRAM. In Cycle C, a third master (M3) is able to queue a write to the DRAM interface. In Cycle D, a fourth master (M4) attempts to write a line to the DRAM controller but receives a Negative ACKnowlege in return. In Cycle E, master M4 has retied the cycle and the DRAM interface has queued the request.

It is important to note that there could be interleaved DRAM interfaces. The use of the NACK instead of inserting waits states frees the bus for other masters to possibly access the alternate bank.

A broadcast cycle is similar to a memory write cycle in that a master attempts to write data to DRAM. All other caches watch for the data transfer to take place (QACK not NACK) and latch the data into their caches simultaneously. A broadcall cycle is similar to a memory read in that a master attempts to read data from DRAM. Just like a read cycle, the data may be supplied by a cache and the DRAM cycle can be terminated. The difference is that all caches latch the data simultaneously. If the requested broadcall data is dirty in a cache, the holder of the dirty line NACKs the broadcall and initiates a writeback. Broadcast data will fill invalid lines in the cache and it will overwrite valid lines. Broadcast data will not be accepted by a cache only if the entire cache set is dirty.

The broadcast/broadcall cycles tend to reduce overall line bus traffic for data structures that will generally need to be referenced by all processors. The DRAM bandwidth can still be rather high as DRAM is constantly updated when the shared data structure is modified. Programmers should place data structures into broadcast space very carefully. Too much broadcast space will tend to over occupy the cache causing frequent misses on standard memory references.

Stream I/O is the mechanism by which virtual FIFOs can be implemented. A virtual FIFO is a section of the cache that can be used as a FIFO allowing automatic buffering of data between two asynchronous processes.

Figure 7:
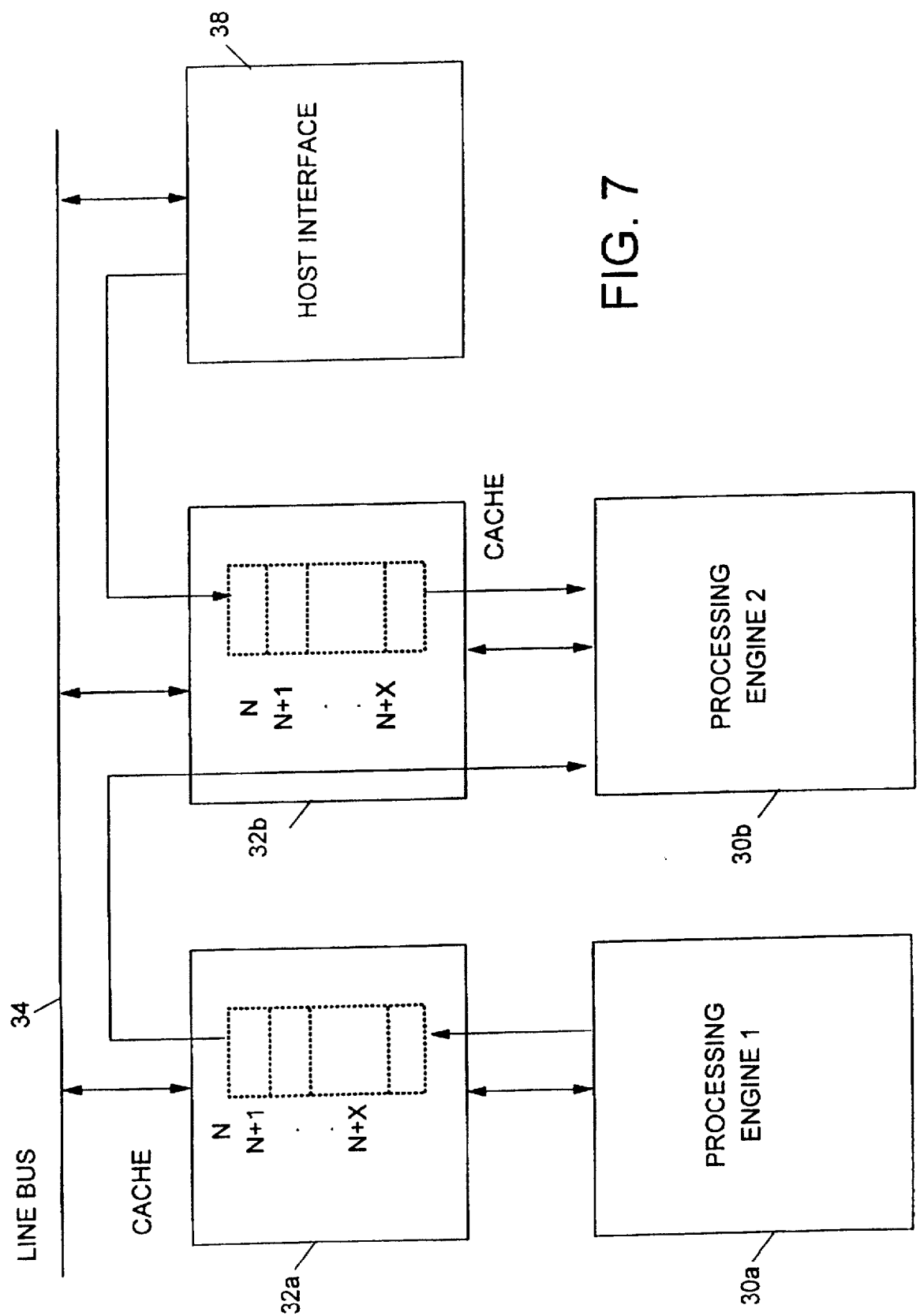
FIG. 7 is a schematic illustration of certain elements of the video processor of FIG. 3, as used in a FIFO cache scheme.

Referring to FIG. 7, two FIFOs have been set up with maximum depth x in each of the two caches shown. The FIFO can be thought of as a circular buffer that resides within the cache 32. It is the responsibility of the input and output devices to generate the correct sequential addresses for I/O to or from the FIFO. For example, if a FIFO began at address 100H and was 16 bytes deep, the address order for input and output should be 100H, 101H, 102H, . . . , 10FH, 100H, 101H . . . . In the example, the host interface is sending data to a FIFO located in the cache for processor two. If the FIFO were full (all positions in the circular buffer occupied) the cache would return a NACK to the host interface. The host would then continually retry until the data is accepted. Similarly, the processor would read from the FIFO. If empty, the processor would stall until data was written in. Assuming that the two processes run at approximately the same speed, data can progress between them with very little polling delay.

FIG. 7 also shows a FIFO pointed in the other direction with respect to the line bus. Processor two can read from the FIFO that is located in the cache for processor one. A NACK is returned if the read occurs when there is no data in the FIFO and processor two will stall until a retry completes. Similarly, processor one will stall if it attempts to write to a full FIFO.

The PVP architecture consists of a unified single memory address space. Each processor in the PVP has access to any memory location. The advanced cache architecture in the PVP maintains data coherency across the various processors in the system.

The PVP instruction set is built on accessing memory and registers. No I/O space is architected into the PVP model except for the special addressing modes provided by the upper eight bits. However, the host interface makes use of Host I/O cycles to access the control bus in the PVP to perform control functions. Each processor in the PVP can access any location in the sixteen MB address space or any address in the Host memory space up to thirty one bits of physical memory. The PVP can be a host master and can initiate memory or I/O cycles.

The raster buffer is relocatable to a programmable memory location. The memory map for the PVP depends upon the user configuration. Each of the processor code and data areas can be located anywhere in the sixteen MB address area. The most common model is to have the raster buffer start at addr 0 followed by the four address spaces for the processors. Each processor has an Address Relocation Register (ARR) that can be used to relocate code at any given location. Note that multiple processors can use a common code area with unique local data areas.

Each processor in the PVP has an address space register that contains a thirty two bit value that is used as an offset for all code fetches. This address is added to all code fetches in the system and all effective address generation. This allows the code windows for each processor to be moved very easily. All data fetches are absolute and do not have a relocation register. It is the programmer's responsibility to calculate any data addresses needed.

The programmer can access the relocation register and use it to form effective addresses for data operations as needed.

The processors in the PVP can generate an effective address for instruction fetch from several locations in processor unit. These include:

1. The processor's Instruction Pointer (IP). Always set with look ahead option enabled.
2. The processor's Branch and Link register (BAL) that contains the return address when any jump instruction is executed. Used by the return instruction (move BAL to IP).
3. Interrupt Vector Address. Address pointer used by the various exceptions routines.
4. Immediate address located in the instruction itself. (Jump to immediate address)
5. Offset address generated by an signed offset in instruction added to the IP register.
6. Address located in an index register. (move IDX to IP).

The upper eight bits of any memory address contain control bits that are used in conjunction with the lower twenty four bits of physical address space. The processor caches, DRAM interface and Host interface all interpret these bits for various special functions. Normal memory address space has a qualifier of all zeros. These bits default to zero when an index register is loaded via a load immediate instruction (twenty four bits). For convenience, the control register for each index register contains the upper eight bits that are used by all index register memory operations. This allows the user to set up an index register for special behavior.

The qualifier bits are defined as follows:

| Host Address Space: | | | | | | | |
|---|---|---|---|---|---|---|---|
| A31 | A30 | A29 | A28 | A27 | A26 | A25 | A24 |
| 1 | Upper address bits of host address space (2 Gb addressability) | | | | | | |

When the msb is set, this indicates that this is a host memory space operation. The Host interface unit will respond to this address by generating a master cycle on the host processor side. The remaining upper seven bits are used as the actual address bits for the host memory space as needed.

| Stream Address Space: | | | | | | | |
|---|---|---|---|---|---|---|---|
| A31 | A30 | A29 | A28 | A27 | A26 | A25 | A24 |
| 0 | 1 | Master ID for stream destination | | | | | |

This mode is used to indicate that the memory operation is a stream type. The master ID is used to address the destination of what processor or device cache will accept the memory transaction.

| Broadcast Address Space: | | | | | | | |
|---|---|---|---|---|---|---|---|
| A31 | A30 | A29 | A28 | A27 | A26 | A25 | A24 |
| 0 | 0 | 1 | 0 | 0 | 0 | 0 | 0 |

This mode is used to indicate that the memory operation is a broadcast. The local D cache in each processor will attempt to cache the memory/data operation. The broadcast, allows multiple cache units to catch the same data and cache it for future access.

| Look Ahead Address Space: | | | | | | | |
|---|---|---|---|---|---|---|---|
| A31 | A30 | A29 | A28 | A27 | A26 | A25 | A24 |
| 0 | 0 | 0 | 1 | 0 | 0 | 0 | 0 |

This mode is used to indicate to the cache units that they should perform look ahead on the current memory address. The cache units will attempt to fetch the next memory line from DRAM. The DRAM interface will also attempt to fetch the next line from DRAM into its own local cache thus setting up a N+1/N+2 pipeline.

| IO Address Space: | | | | | | | |
|---|---|---|---|---|---|---|---|
| A31 | A30 | A29 | A28 | A27 | A26 | A25 | A24 |
| 0 | 0 | 0 | 0 | 1 | local | 0 | 0 |

This mode is used to indicate the current operation is an I/O address. The address can be a local I/O address or can be an external host I/O cycle depending upon the local bit above. The Host interface unit will pick up external I/O requests and generate a master I/O cycle to the HOST I/O space using the lower twenty four bits for I/O space addressability.

Local I/O cycles are decoded and responded to by a data port attached to each processor in the PVP. A processor may or may not have an I/O device attached to its data port. The video input FIFO is an example of an I/O device attached to one of the data ports in the PVP. The processor reads live video data from a FIFO via local I/O and processes the data.

| Auto Flush: | | | | | | | |
|---|---|---|---|---|---|---|---|
| A31 | A30 | A29 | A28 | A27 | A26 | A25 | A24 |
| 0 | 0 | 0 | 0 | 0 | 1 | 0 | 0 |

This bit causes the cache controller to automatically clear the valid bit when a byte is read from the cache unit thus invalidating the line when it has been consumed. When the line is full (all bytes are dirty) the line is automatically written to the DRAM unit and the line invalidated.

The PVP processor complex consists of a super scalar architecture that allows both an ALU operation and a Load/Store operation to execute simultaneously in a single clock. All operations take one clock to execute. However, due to the unique design to process video, the PVP engine can accomplish several operations in a single cycle and is designed to process digital streams of data such as MPEG and Live Video, etc. The instructions have two formats— short and long (referring to the Load/Store operation). The short operations allow an ALU operation to occur simultaneously. The long form takes the full instruction word and no ALU operation is performed. The short form is the most common and allows the ALU and Load/Store units to operate simultaneously. The long form is used exclusively by the Load/Store unit and causes the ALU to stall until the next instruction word (1 clock).

The instruction stream is fetched from I Cache using the Instruction Pointer (IP) which always points to a DWORD (thirty two bit) entry (lower two bits=zero). Each cache line consists of four instructions that are consumed by the processor in four clocks (assuming no branches or interrupts occur). In order to prevent the processor complex from stalling (waiting on instructions), the I Cache controller incorporates a sophisticated prefetch and branch target algorithm.

Figure 8:
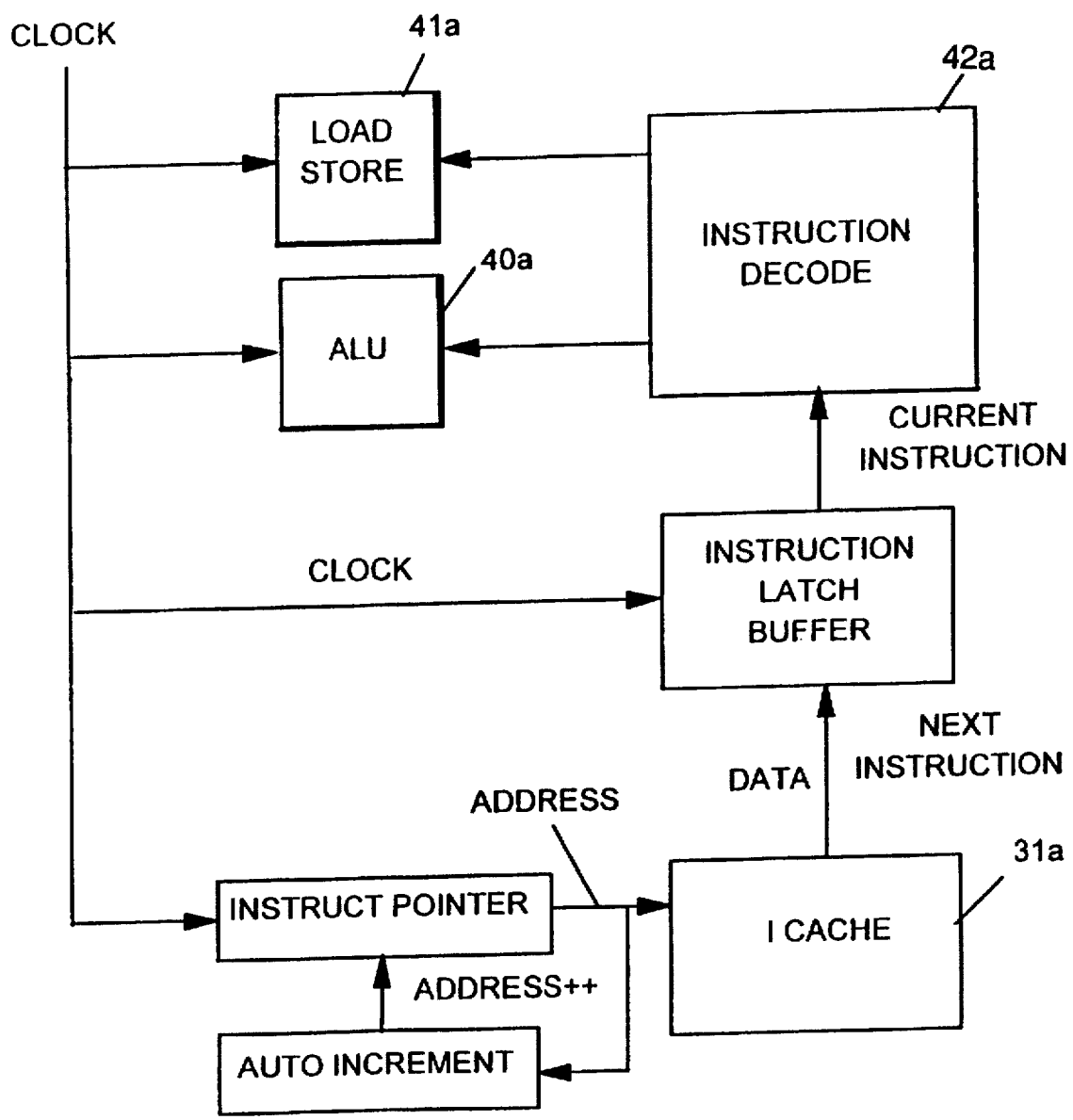
FIGS. 8 and 9 are schematic illustrations of the instruction flow in certain operations of the video processor of FIG. 3.

The instruction decoder (indicated at 42a in FIG. 8) makes use of simple decoders and demultiplexers to control the ALU and Load/Store unit operations. On each clock edge, the result of the ALU and Load/Store unit is latched into the appropriate register and a new instruction is latched into the decode buffer and the IP is auto incremented. The decode buffer always holds the current instruction while the IP has already been incremented (on the clock edge) and is pointing to the next instruction. This causes the next instruction to be latched into the decode buffer even if the current instruction is a jump instruction and modifies the IP. I.E. the next instruction after a jump instruction is always executed. However, the I Cache gets the next instruction address early and has time to present the requested data. Greater depth of instruction look ahead was not needed due to the prefetch algorithm used in the I Cache.

The Load/Store unit 41a and ALU 40a always execute in lock step fashion. This places the burden of instruction re-order on the programmer but greatly reduces the chip complexity.

The instruction cache 31 is used to store executable code for the microcoded engines. The program store is organized as a cache rather than a fixed address data RAM so that code does not have any artificial limits. The size of the cache is of course fixed (one Kb) but the cache will dynamically adapt to hold the most recently executed code. The instruction cache only needs to be single ported, that is, it is not required to snoop on the bus to invalidate cache lines (although it may be able to supply lines to a requesting master). Therefore, the host processor is responsible for invalidating the cache whenever it changes executable code. The cache will then have to reload its cache lines from DRAM.

The cache is organized as a two way set associative cache with automatic look ahead. Each instruction cache line holds the sixteen data bytes that comprise that line along with an address tag. For this configuration of a two way set associative one Kb cache with sixteen Mb of physical cacheablity, the tag would need to be fifteen address bits. A valid bit is then used to indicated whether the line is valid. The host could flush individual instruction caches by writing to a control bit using the control bus. This would have the effect of clearing all valid bits simultaneously. Alternately, a region in memory could be reserved as non-executable space, e.g. the upper one Kb of physical memory. Therefore instead of using a valid bit, all lines would always be assumed to be valid. Flushing the cache would set all tag bits to ones (specifying the reserved address space).

The Least Recently Used (LRU) bit is used as a flag for each set indicating which line to throw away when a miss occurs. The simplest algorithm for the LRU bit could be as follows:

Set LRU=0 if currently the accessed line is an "A" line.
Set LRU=1 if the currently accessed line is a "B" line.
When a miss occurs and LRU=1, replace line "A".
When a miss occurs and LRU=1, replace line "B".

An alternate algorithm could be chosen that would interpret the LRU bit slightly differently. This algorithm has the affect of making the cache hold branch targets longer:

When a miss occurs and LRU=1, replace line "A" and set LRU=0.
When a miss occurs and LRU=0, replace line "B" and set LRU=1.

The instruction cache is always in look ahead mode due to the highly sequential nature of code execution. In other words, whenever an instruction line is fetched from the cache, the next sequential address is compared to see if it is available (its tag matches the requested tag as well). If not, a look ahead miss occurs and the code fetch is initiated. In order to cache ahead, the address decoder of the cache always selects the current set as well as the next set. This can be accomplished with a simple OR gate on each output of the address decoder. Both sets are fetched simultaneously to check for current address hit and read ahead hit.

Figure 9:
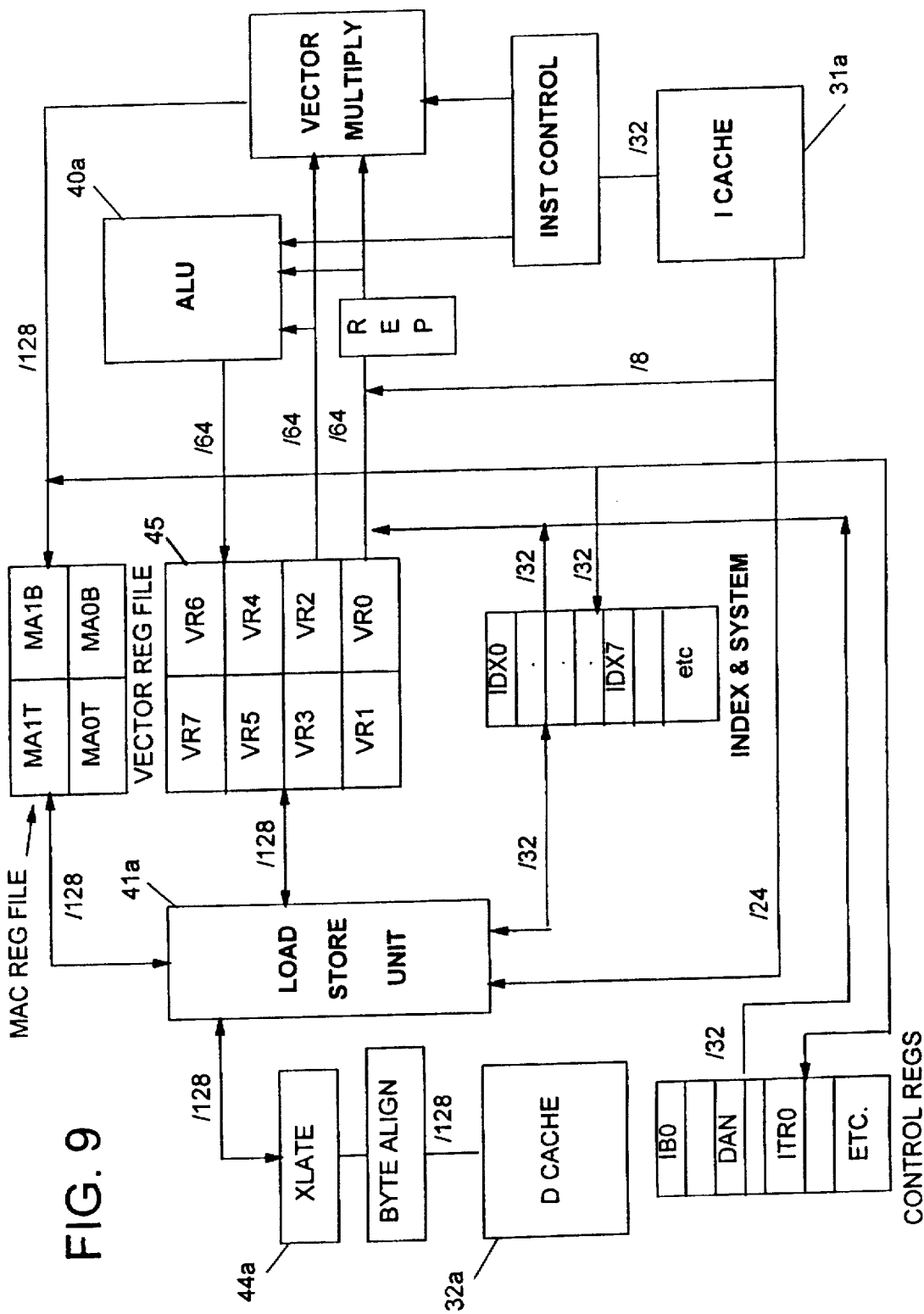

The translation unit (Xlate) 44a (FIG. 9) is controlled by the translation field contained in the corresponding Index Control Register (ICR) when memory is referenced via the index register. The ICR specifies one of N translation methods. Different translations have different data sizes and imply certain restrictions in the registers they access. All translations are bi-directional and can be used in Load or Store operations. The following translations are supported.

1. No translation (Default)—This mode passes the data through the unit with no change. The width of the operation is implied in the Load/Store unit opcodes.
2. RGB16—This mode takes a 16 bit value and breaks apart the 5 bit RGB values and stores each 5 bit value into an element of a vector register. The MSB of the RGB16 is stored in the most significant element of the vector register.
3. YUV 4:2:2—This mode takes YUV 4:2:2 data that is 32 bits in length and creates two vector pairs from the 4:2:2 data. Each vector represents a "pel" that contains an intensity value along with the Cr and Cb values. The most significant element is not affected in the translation. This translation always acts on 32 bit data and double register pairs. The Cr/Cb values are duplicated on loads and the 2nd Cr/Cb values are ignored on store operations.
4. RGB32 (Byte to Word)—This mode takes a 32 bit value in RGB24 plus alpha format and loads the corresponding bytes into the elements of a vector register. The 4th byte can be used as alpha or other information. Bytes are not sign extended.
5. Byte Swap—This mode swaps the bytes in a normal vector load. The translation is performed on the 64 bit load value and Load/Store op code can further reduce the data as needed to a single or double element.
6. Word Swap—This mode is the same as byte swap only the 16 bit words are swapped instead of the bytes. The translation is performed on the 64 bit load value and Load/Store op code can further reduce the data as needed to double element. Element 0 becomes element 3, etc.
7. Bit Swap—This mode performs a MSB to LSB swap on the 16 bit values loaded. The translation is performed on the 64 bit load value and Load/Store op code can further reduce the data as needed to a single or double element.
8. Word to Dword—This mode performs a word (16 bit) to Dword load (32 bits) into a vector register or register pair. The word is not sign extended.
9. Byte Packed—Each word consists of packed bytes in an alternating fashion. The vectors elements are loaded with every other byte sign extended and the other bytes are loaded into the other vector register in the same fashion. This mode is useful for packed data values like chrominance data.

The replication unit in the PVP is an important feature of the vector ALU unit. Any of the main general purpose vector registers (VR0–VR7) can be accessed as a single element for both the source of an operation and the destination. For the destination, the operation is just a simple element enable control that only lets the selected element of the vector be modified. All other elements remain unchanged. For the source of an operation, the specified sub element of the vector is replicated across the remaining elements of the vector. This produces the effect of a vector of all the same values input into the vector ALU unit.

The registers are divided into three logical groups of register banks based on access size and register attributes. The three groups of registers are general purpose Vector Registers, Multiply-Accumulate (MAC) Vector Registers and Index/System registers. All registers may be accessed by a 6 bit absolute register number. Register numbers 0–7 are reserved for the Vector Registers, 8–15 are reserved for the MAC registers, 16–31 are reserved for the Index/system registers and 32–63 are reserved for System/Control registers.

The vector register file (indicated at 45 in FIG. 9) is composed of eight (8) individual addressable vector registers that each contain four (4) elements. Each element consists of a sixteen bit register that may be individually addressed. When a vector register is accessed, it can be viewed as a single sixteen bit element, a four element vector (with sixteen bit elements) or a two element vector (with thirty two bit elements). In addition, a pair of vector registers may be accessed in certain Load/Store operations.

The vector registers are represented by a 3 bit register number and consist of addresses 0 through 7 (000–111). In order to access a sub element of a vector, a two bit sub element number is used (00–11). For thirty two bit operations the sub element number is restricted to 0 or 2 (00,10).

| 6 bit reg # | Reg Name |
| --- | --- |
| 000000 | VR0 (Used also for reg pair ops) |
| 000001 | VR1 |
| 000010 | VR2 (Used also for reg pair ops) |
| 000011 | VR3 |
| 000100 | VR4 (Used also for reg pair ops) |
| 000101 | VR5 |
| 000110 | VR6 (Used also for reg pair ops) |
| 000111 | VR7 |

The Vector Register file has two special features called the Replication Unit and the Sub Element Unit. The Replication unit is responsible for replicating a specific singular element of a vector register across the remaining elements of the vector. This presents to the data bus a vector containing the same value in all the elements. The replication unit can replicate any element of any vector register and supports both 16 bit elements and 32 bit elements.

The Sub Element Unit allows the user to only store data in a specific element of a vector. The other elements are not affected. The selected sub element has its contents altered by the ALU or Load/Store operation. The sub element unit supports both sixteen bit elements and thirty two bit elements.

The PVP ALU 40 has a four element Condition Code Register (CCR). The four element condition code register is used by the ALU on arithmetic, logical and conditional instructions. Each element in the CCR is set or used by the corresponding ALU for that element. For thirty two bit operations CCR(0) and CCR(2) are used. The CCR contains the usual four flags of carry, zero, negative and overflow. In addition, the CCR contains a carry flag from the corresponding element in the MAC and three user flags that can be set/cleared by the user.

One of the unique aspects of the PVP is the vector based ALU and the corresponding "Conditional" instructions. Almost all ALU operations have a conditional mode where the result of the ALU operation is only stored back into the destination vector based on the corresponding condition codes for each element. The conditional operations in the PVP allow the PVP to process vectors very efficiently.

The Branch and Link register (BAL and BALI) in the PVP processor is used to hold the return address from all jump instructions and external interrupts. All jumps (conditional and non conditional) cause the IP to be saved to the BAL register. It is the responsibility of the target location to save the IP address to memory to allow for multiple levels of subroutine nesting. This feature on the PVP allows any jump instruction to become a subroutine call if desired. Interrupts cause the current IP to be saved into the BALI register and automatically disable interrupts until the interrupt handler saves the return address from the BALI and enables interrupts in the PCR.

Figure 10:
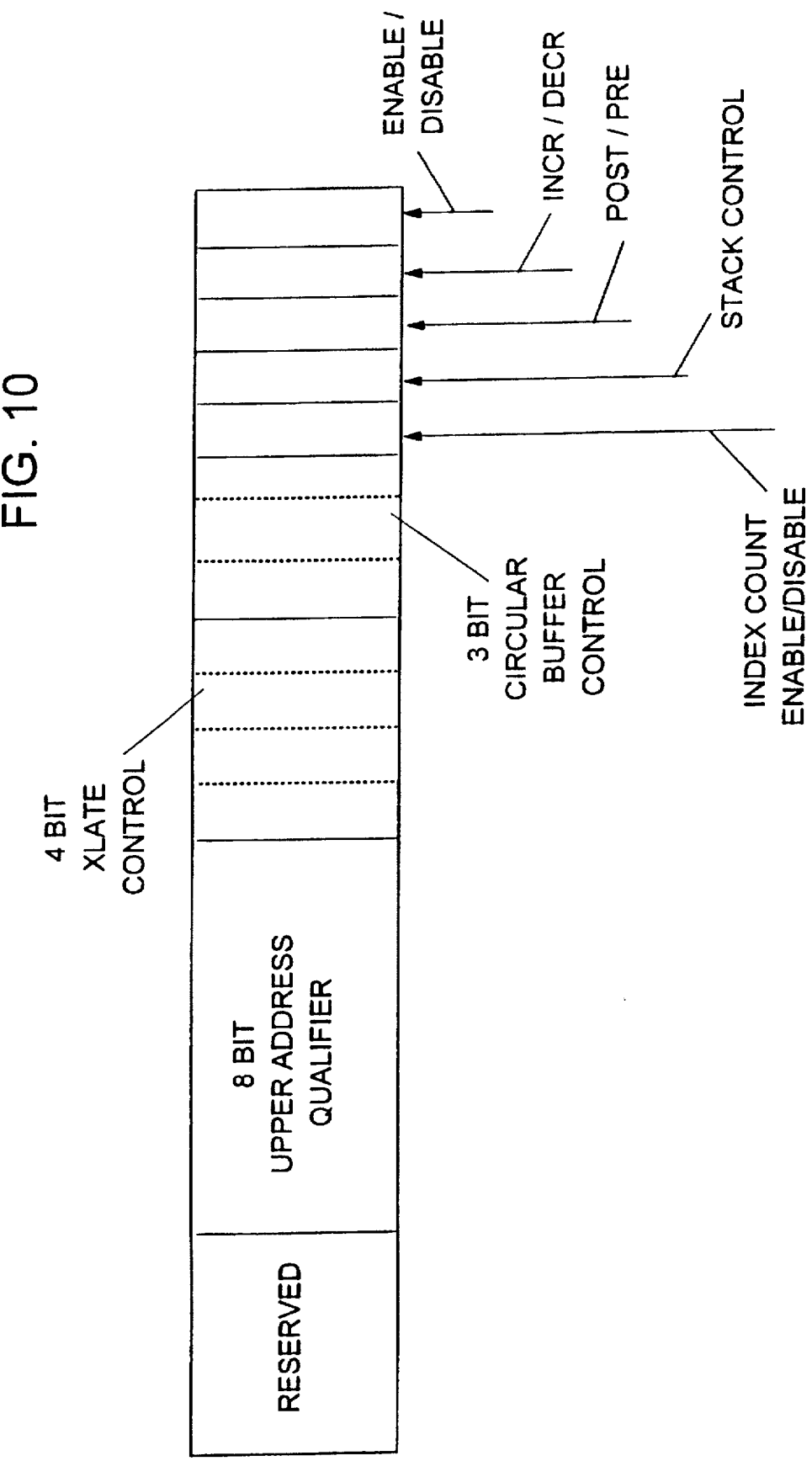
FIG. 10 is a schematic illustration of bit assignments in certain data flows within the video processor of FIG. 3.

The index registers in the PVP are very powerful. Each index register has a corresponding Index Control Register (ICR0–ICR7) that is used to control the various functions that the index register can perform. FIG. 10 shows the control bits for the ICR register.

The index register is automatically incremented or decremented by the word size on every access to memory via the Load/Store unit. The enable/disable bit in the ICR is used to control this function. The increment/decrement bit is used to control the direction of the index pointer. The post/pre bit is used to control when the automatic increment/decrement takes place (either before the operation or after the operation). The stack control bit sets up the index register to act like a stack. On read operations the index register is pre incremented and the value read from memory. On write operations data is written to memory and the index register is post decremented. The index count enable/disable bit is used to control if the associated count register is decremented as well. Note that the count register is always decremented by one.

The three bit circular buffer control bits are used to set up the index register as a circular buffer. A value of zero disables this function. The other seven states represent the size (n) of the circular buffer as a power of two (n+2). The size ranging from four bytes to five hundred twelve bytes. The bits are used as a mask when the index register is incremented/decremented. The buffer must be aligned according to its size.

The four bit Xlate control bits are used to specify the translation function for this index register. A value of zero disables this function. The other states specify the translation method that will be used by the Load/Store unit.

The eight bits of upper address are used to control the special address modes supported by the PVP.

The Load/Store unit 41 on the PVP is composed of a scalar/vector load/store unit capable of loading a variety of data widths from memory. The smallest width is sixteen bits or two bytes from/to memory. Data widths can be sixteen, thirty two, sixty four or one hundred twenty eight bits in width. This allows the load/store unit to store individual elements as well as complete vectors and double vectors to memory. Data can be on any byte boundary. The byte alignment unit will take care of alignment issues.

In addition, the Load/Store unit has an associated translation unit through which all memory accesses are performed. The translation unit is controlled by the index control register. In the default mode, the translation unit just passes through the data. Other modes allow the translation unit to convert to/from different data formats such as RGB16 or YUV 4:2:2. A byte alignment unit is also included allowing the load store operations for all widths to occur on any word boundary. Therefore, sixty four bit and one hundred twenty eight bit load store operations do not have to occur on the normal address boundary.

The load/store operations are broken into two formats called the short format and long format. The short format load/store operations occur simultaneously with the ALU operations and the long format execute by them selves and stall the ALU for 1 clock.

All short form load/store operations reference memory indirectly via one of the eight index registers. The source/destination of all short load/store operations from memory is the main vector register file or the MAC register file. An index value can be loaded directly from memory only in long form. Indexes must be loaded via immediate values or via a move from one of the vector registers.

Figure 11:
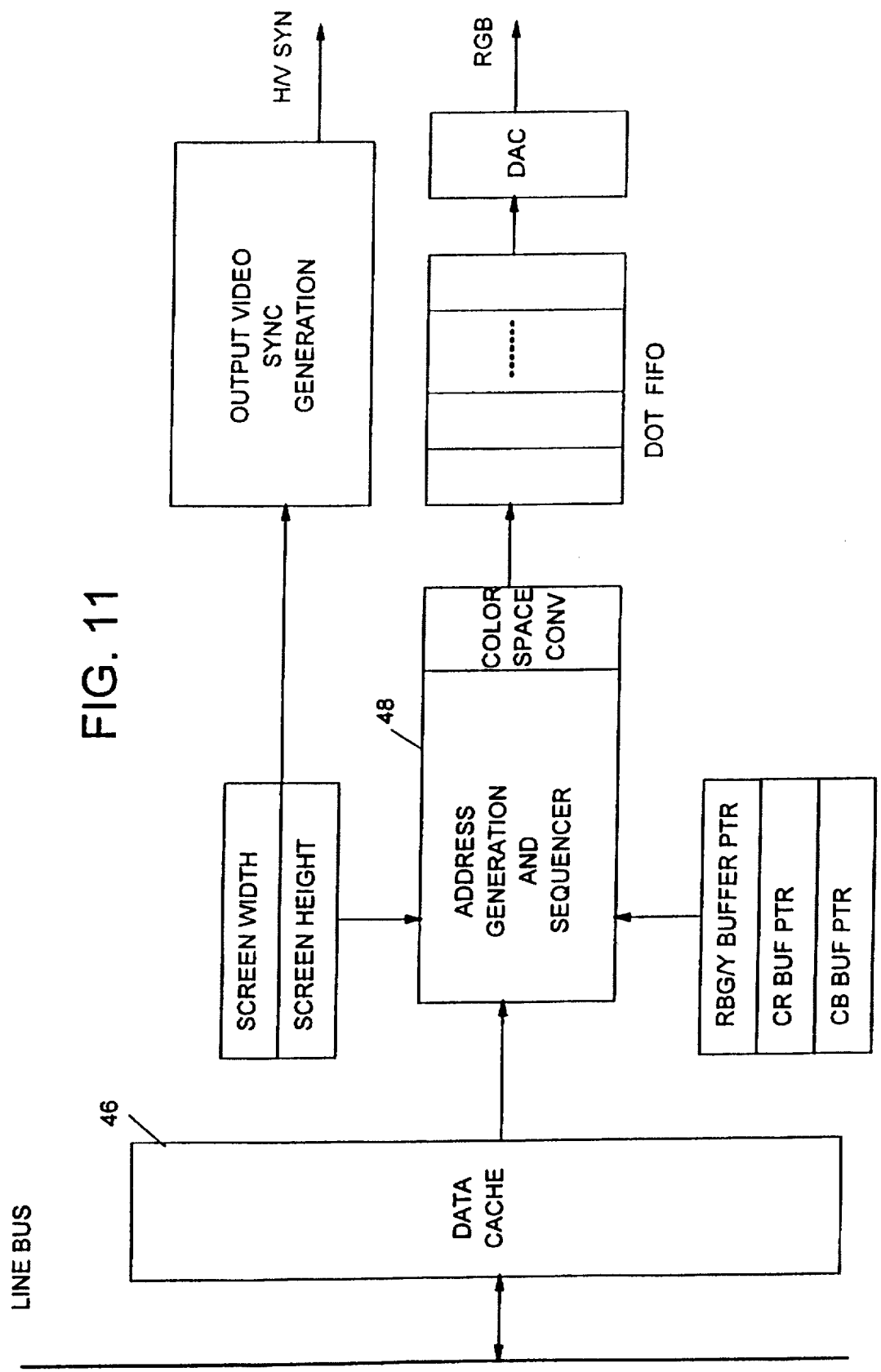
FIG. 11 is a schematic illustration of data flows within the video processor of FIG. 3 which are associated with output of a video signal to a display.

The video rasterizer 36 (and FIG. 11) is the subsystem that is responsible for "painting" the image on the output video device. This device will most usually be a CRT which means that the format of the output stream will be vertical and horizontal sync signals along with a data stream of RGB or YUV encoded data.

The rasterizer needs only to be a master on the line bus 34. It will be reading the appropriate portion(s) of DRAM in order to produce the output stream. For this reason, it will contain a data cache 46 similar to one of the microcoded engines. The size of the cache may be much smaller as the purpose of the cache is only to maintain the cache coherency protocol and to allow data to be read using the efficient line transfer mode. The "engine" 48 managing the transfer will be a hardcoded engine that can read and translate the data for various refresh frequencies for a YUV or RGB output buffer. The engine will write the stream data to a FIFO before it goes to the DAC to be driven off chip. The FIFO can also be filled by the general purpose engine (30d in FIG. 3) when special output processing is required. Video data will be pulled from the FIFO synchronous to the output dot clock. The FIFO will be filled rather sporadically by the output engine due to line bus contention. The rasterizer can lock the bus and fill its FIFO if the FIFO gets too close to becoming empty. Normally the FIFO should operate near full, allowing normal bus requests to be used for rastering output.

Figure 12:
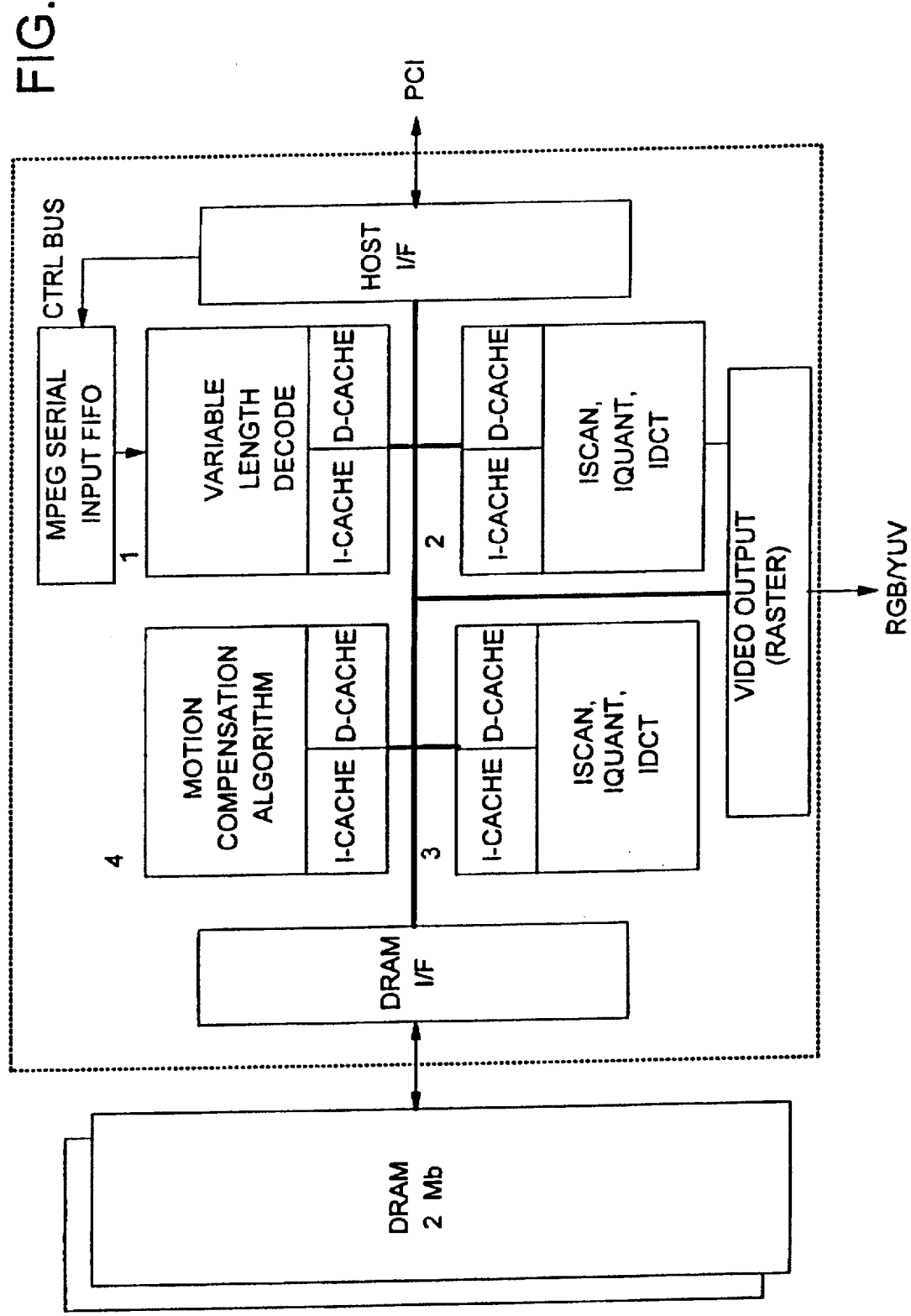
FIG. 12 is a schematic illustration of the adaptation of the video processor of FIG. 3 to one specific application for video signal processing.

FIG. 12 shows how the MPEG2 algorithm could map onto the PVP. Each of the four engines is assigned a portion of the decompression. Engine 1 is physically attached to the serial input FIFO. Logically therefore, it will perform the variable length decoding and serve as the master controller of the other three. It will assemble the sixty four element arrays that get passed to the inverse scan process. This passing of data is performed via a shared memory buffer. Note however that due to the cache architecture, the data may never actually get written to DRAM. It will stay dirty and move from cache to cache as needed. Two engines (numbers 2 and 3) are dedicated to the inverse scanning, inverse quantization, and inverse discrete cosine transforms of the 8×8 matrices. These two engines should be able to process over 100,000 non zero 8×8 matrices/sec. Motion compensation is performed by the last engine. It receives the output of the IDCT and adds it to the reference block(s) form the current block. The video output subsystem must be configured to display the YCrCb buffers of the previous frame while the current frame is being constructed.

In the drawings and specifications there has been set forth a preferred embodiment of the invention and, although specific terms are used, the description thus given uses terminology in a generic and descriptive sense only and not for purposes of limitation.

What is claimed is:

1. An integrated circuit device comprising:
   a substrate,
   a plurality of identical processors formed on said substrate,
      each of said processors having an instruction cache, a data cache, a bus interface unit, an arithmetic logic unit, a load/store unit, and a translation unit associated with said load/store unit, said load/store unit and said translation unit cooperating for passing all flow of data bit streams from said data cache and for translating flowing data bit streams from a first data format to a second data format;

each of said plurality of processors operatively associated with a plurality of index registers formed on said substrate, each of said index registers for receiving and retaining instruction data accessible to the one of said processors with which said index register is associated for directing data flow into and out of the associated data cache;

a plurality of index control registers each formed on said substrate and operatively associated with a corresponding one of said index registers and a corresponding translation unit for receiving and retaining control data having at least first and second control fields of first and second fixed sizes respectively, and wherein said first field contains translation method data specifying one of at least two different translation methods for controlling the translation unit to translate said flowing data bit streams in accordance with a translation method specified by said translation method data and said second field contains control data for controlling at least one of a plurality of functions of said index registers;

a line bus formed on said substrate and interconnecting all of said plurality of processors for transferring data bit streams thereamong;

a video input interface unit formed on said substrate and connected to said line bus for receiving an input signal stream;

a video output interface unit formed on said substrate and connected to said line bus for delivering from the integrated circuit device an output video signal stream determined from processing by said plurality of processors;

a host interface unit formed on said substrate and connected to said line bus for exchanging with a host processor control signals effective for governing the function of said plurality of processors;

a control bus formed on said substrate and interconnecting said host interface unit and said plurality of processors for exchange of control signals therewith apart from data bit streams transferred over said line bus; and a memory interface unit formed on said substrate and connected to said line bus for exchanging with memory elements data bit streams processed and to be processed by said plurality of processors.

2. An integrated circuit device according to claim 1 wherein said translation method data specifies transferring unaltered data bit streams, and said load/store unit, said translation unit and an associated one of said index control registers cooperate for transferring unaltered data bit streams.

3. An integrated circuit device according to claim 1 wherein said translation method data specifies transferring RGB16 data bit streams as vector data, and said load/store unit, said translation unit and an associated one of said index control registers cooperate for transferring RGB16 data bit streams as vector data.

4. An integrated circuit device according to claim 1 wherein said translation method data specifies transferring YUV 4:2:2 data bit streams as vector pair data, and said load/store unit, said translation unit and an associated one of said index control registers cooperate for transferring YUV 4:2:2 data bit streams as vector pair data.

5. An integrated circuit device according to claim 1 wherein said translation method data specifies transferring YUV data bit streams as RGB data, and said load/store unit, said translation unit and an associated one of said index control registers cooperate for transferring YUV data bit streams as RGB data.

6. An integrated circuit device according to claim 1 wherein said translation method data specifies transferring RGB32 data bit streams as vector data, and said load/store unit, said translation unit and an associated one of said index control registers cooperate for transferring RGB32 data bit streams as vector data.

7. An integrated circuit device according to claim 1 wherein said translation method data specifies swapping data bytes on transfer, and said load/store unit, said translation unit and an associated one of said index control registers cooperate for swapping data bytes on transfer.

8. An integrated circuit device according to claim 1 wherein said translation method data specifies swapping data words on transfer, and said load/store unit, said translation unit and an associated one of said index control registers cooperate for swapping data words on transfer.

9. An integrated circuit device according to claim 1 wherein said translation method data specifies swapping most significant bit and least significant bit on transfer, and said load/store unit, said translation unit and an associated one of said index control registers cooperate for swapping most significant bit and least significant bit on transfer.

10. An integrated circuit device according to claim 1 wherein said translation method data specifies translating word transfers into double word transfers, and said said load/store unit, said translation unit and an associated one of said index control registers cooperate for translating word transfers into double word transfers.

11. A system for handling digital data and generating video display signals, the system comprising:

a central processing unit;

system random access memory for receiving and storing and delivering digital data;

a bus interconnecting said central processing unit and said system random access memory for transferring digital data signals; and a video processor integrated circuit device operatively connected to said bus and thereby to said central processing unit and to said system random access memory, said video processor integrated circuit device processing video display signals under the direction of said central processing unit and having:

a substrate, a plurality of identical processors formed on said substrate, each of said processors having an instruction cache, a data cache, a bus interface unit, an arithmetic logic unit, a load/store unit, and a translation unit associated with said load/store unit, said load/store unit and said translation unit cooperating for passing all flow of data bit streams from said data cache and for translating flowing data bit streams from a first data format to a second data format;

each of said plurality of processors operatively associated with a plurality of index registers formed on said substrate, each of said index registers for receiving and retaining instruction data accessible to the one of said processors with which said index register is associated for directing data flow into and out of the associated data cache;

a plurality of index control registers each formed on said substrate and operatively associated with a corresponding one of said index registers and a corresponding translation unit for receiving and retaining control data having at least first and second control fields of first and second fixed sizes respectively, and wherein said first field contains translation method data specifying one of at least two different translation methods for controlling the translation unit to translate said flowing data bit streams in accordance with a translation method specified by said translation method data and said second field contains control data for controlling at least one of a plurality of functions of said index registers;

a line bus formed on said substrate and interconnecting all of said plurality of processors for transferring data bit streams thereamong;

a video input interface unit formed on said substrate and connected to said line bus for receiving an input signal stream;

a video output interface unit formed on said substrate and connected to said line bus for delivering from the integrated circuit device an output video signal stream determined from processing by said plurality of processors;

a host interface unit formed on said substrate and connected to said line bus for exchanging with a host processor control signals effective for governing the function of said plurality of processors;

a control bus formed on said substrate and interconnecting said host interface unit and said plurality of processors for exchange of control signals therewith apart from data bit streams transferred over said line bus; and a memory interface unit formed on said substrate and connected to said line bus for exchanging with memory elements data bit streams processed and to be processed by said plurality of processors.

12. An integrated circuit device according to claim 1, wherein said line bus has a width which is operative to transfer (1) an entire cache line between all of said instruction caches and all of said data caches in a single bus cycle, or (2) an entire cache line between all of said instruction caches or all of said data caches and said memory interface unit in a single bus cycle.

13. An integrated circuit device according to claim 1 wherein said two different translation methods are transferring RGB16 data bit streams as vector data and transferring YUV 4:2:2 data bit streams as vector pair data, and wherein said translation method data specifies transferring RGB16 data bit streams as vector data.

* * * * *